(12) United States Patent
Bouchard et al.

(10) Patent No.: US 12,504,970 B2
(45) Date of Patent: Dec. 23, 2025

(54) ELECTRONIC SYSTEM FOR AUTHENTICATING PERMISSIONS BETWEEN INTERCONNECTED RESOURCES

(71) Applicant: BANK OF AMERICA CORPORATION, Charlotte, NC (US)

(72) Inventors: Pierre Jacques Bouchard, Davidson, NC (US); Manu Jacob Kurian, Dallas, TX (US); John L. Reilly, Charlotte, NC (US); Lakshminarayana Vishnubhotla, Skillman, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 417 days.

(21) Appl. No.: 17/887,073

(22) Filed: Aug. 12, 2022

(65) Prior Publication Data
US 2024/0054242 A1    Feb. 15, 2024

(51) Int. Cl.
| | | |
|---|---|---|
| *G06F 8/70* | (2018.01) | |
| *G06F 9/46* | (2006.01) | |
| *G06F 9/50* | (2006.01) | |
| *G06F 21/44* | (2013.01) | |
| *G06F 21/62* | (2013.01) | |
| *G06F 21/64* | (2013.01) | |

(52) U.S. Cl.
CPC .............. *G06F 8/70* (2013.01); *G06F 9/468* (2013.01); *G06F 9/5005* (2013.01); *G06F 21/445* (2013.01); *G06F 21/6218* (2013.01); *G06F 21/64* (2013.01); *G06F 2209/506* (2013.01)

(58) Field of Classification Search
None
See application file for complete search history.

(56) References Cited

U.S. PATENT DOCUMENTS

| | | |
|---|---|---|
| 7,552,093 B2 | 6/2009 | Levin et al. |
| 7,895,651 B2 | 2/2011 | Brennan |
| 7,934,197 B2 | 4/2011 | Thorell |
| 8,307,351 B2 | 11/2012 | Weigert |
| 8,499,006 B2 | 7/2013 | Okabe |
| 8,504,405 B2 | 8/2013 | Miller et al. |
| 8,769,296 B2 | 7/2014 | Etchegoyen |

(Continued)

*Primary Examiner* — Qing Chen
(74) *Attorney, Agent, or Firm* — Moore & Van Allen PLLC; William Walters

(57) ABSTRACT

Systems that aid in application development, in particular, to the use of a resource ontology system that includes an interconnected map that links resources that interact with each other, as well as the individual components of the resources. The resource ontology system further stores the authentication of the resources, including if the resources are validated for use within application development, as well as whether or not the resources meet or fail to meet other resource requirements. The resource ontology system allows a user developing an application to access resources for use in the application development, which are trusted resources, and allows the organization to aid in standardizing and optimizing the use of resources that users may use in developing applications. Furthermore, the resource ontology system allows the user to more easily access and use secondary resources that are linked with resources already used by the user for application development.

15 Claims, 4 Drawing Sheets

(56) References Cited

U.S. PATENT DOCUMENTS

| | | |
|---|---|---|
| 9,092,575 B2 | 7/2015 | Koenig et al. |
| 9,712,385 B2 | 7/2017 | Taylor et al. |
| 9,853,819 B2 | 12/2017 | Truu et al. |
| 10,637,669 B2 | 4/2020 | Johnson et al. |
| 10,708,136 B2 | 7/2020 | Anandam et al. |
| 10,725,775 B2 | 7/2020 | Suarez et al. |
| 10,740,093 B2 | 8/2020 | Lai et al. |
| 10,805,185 B2 | 10/2020 | Kolar et al. |
| 10,853,481 B1 | 12/2020 | Magnuson et al. |
| 10,901,727 B2 | 1/2021 | Biddle et al. |
| 11,023,215 B2 | 6/2021 | Biskup et al. |
| 11,086,917 B2 | 8/2021 | Arora et al. |
| 11,150,888 B2 | 10/2021 | Beard |
| 11,178,182 B2 | 11/2021 | Saxena et al. |
| 11,797,479 B2 | 10/2023 | Kothari et al. |
| 2003/0078894 A1* | 4/2003 | Kon ............... H04L 63/0869 705/64 |
| 2004/0186762 A1 | 9/2004 | Beaven et al. |
| 2006/0133310 A1* | 6/2006 | Rajaniemi ............... H04L 67/04 370/328 |
| 2010/0011446 A1* | 1/2010 | Klucher ............... G06F 21/575 726/27 |
| 2012/0036497 A1 | 2/2012 | Karthik et al. |
| 2012/0079091 A1* | 3/2012 | Ermis ............... H04L 41/024 709/223 |
| 2012/0240096 A1 | 9/2012 | Sass |
| 2014/0258363 A1* | 9/2014 | Peco ............... H04L 51/52 709/202 |
| 2017/0279818 A1 | 9/2017 | Milazzo et al. |
| 2017/0364552 A1 | 12/2017 | Pattanaik et al. |
| 2018/0091516 A1* | 3/2018 | Nixon ............... G06Q 10/06 |
| 2019/0303623 A1 | 10/2019 | Reddy et al. |
| 2019/0327271 A1* | 10/2019 | Saxena ............... G06F 8/38 |
| 2022/0038294 A1 | 2/2022 | Hamasni et al. |
| 2022/0179707 A1* | 6/2022 | Jreij ............... G06F 9/5005 |
| 2022/0237306 A1* | 7/2022 | Saad ............... G06F 21/52 |
| 2022/0245285 A1* | 8/2022 | Kitahara ............... G06F 11/3457 |

* cited by examiner

```
                                                    ┌─ 400
```

| |
|---|
| CREATE AN APPLICATION SIGNATURE FOR AN APPLICATION AFTER THE ORIGINAL APPLICATION IS DEVELOPED (E.G., AN APPLICATION IS DEVELOPED BY ONE OR MORE USERS THAT ACCESSES A PLURALITY OF RESOURCES), WHEREIN THE APPLICATION SIGNATURE IS AN INDICATOR OF THE APPLICATION (E.G., THE VERSION OF THE APPLICATION, THE COMPONENTS OF THE APPLICATION, OR THE LIKE ), THE RESOURCES THAT ARE ACCESSED BY THE APPLICATION (E.G., VERSIONS, LOCATION, SOURCE, VERIFICATION, OR THE LIKE OF THE RESOURCES), THE RESOURCES THAT ACCESS THE APPLICATION (E.G., VERSIONS, LOCATION, SOURCE, VERIFICATION, OR THE LIKE). THE SIGNATURE MAY BE CREATED USING HASHING, TOKENS, ALGORITHMS, OR THE LIKE. THE SIGNATURE MAY BE CREATED THROUGH THE USE OF ARTIFICIAL INTELLIGENCE (AI) / MACHINE LEARNING (ML) <br> 402 |

↓

| |
|---|
| THE APPLICATION SIGNATURE IS COUPLED TO THE APPLICATION <br> 404 |

↓

| |
|---|
| AI/ML IS USED TO MONITOR WHEN APPLICATIONS AND/OR RESOURCES ARE UPDATED <br> 406 |

↓

| |
|---|
| WHEN AN APPLICATION AND/OR THE RESOURCE IS UPDATED ACCESS THE MAPPING OF THE APPLICATION AND/OR THE RESOURCES (E.G., THE MAPPING MAY BE BASED ON A LINKED DATABASE, BASED ON THE SIGNATURES OF THE RESOURCES, OR THE LIKE) <br> 408 |

↓

| |
|---|
| IDENTIFY THAT THE APPLICATION AND/OR RESOURCES ARE STILL 1) VALIDATED (E.G., NOT TAMPERED WITH AND/OR NO LONGER MEET THE REQUIREMENTS FOR VALIDATION) AND 2) COMPATIBLE (E.G., THE APPLICATIONS AND RESOURCES THAT INTERACT WILL OPERATE AS INTENDED) <br> 410 |

↓

| |
|---|
| ALTER THE APPLICATION SIGNATURE (E.G., CHANGE THE SIGNATURE, ADD TO THE SIGNATURE, ADD A TAG TO THE SIGNATURE, OR THE LIKE) FOR THE APPLICATION BASED ON THE UPDATED APPLICATION OR UPDATED RESOURCES WITH WHICH THE APPLICATION INTERACTS <br> 412 |

↓

| |
|---|
| UPDATE THE MAPPING BETWEEN THE APPLICATION AND/OR RESOURCES <br> 414 |

*FIG. 4*

ELECTRONIC SYSTEM FOR AUTHENTICATING PERMISSIONS BETWEEN INTERCONNECTED RESOURCES

FIELD

The present disclosure relates to a security system that aids in the creation and monitoring of applications and the interaction between resources, and more particularly, to authentication of interconnected resources for use with the applications created.

BACKGROUND

Traditional security systems face increasing challenges in detecting and dealing with potential security issues since attempted cybersecurity breaches have become more frequent and severe over time as automation and digitization has increased within organizations. There exists a need for providing a more efficient cybersecurity systems.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The present invention relates to systems that aid in application development, in particular, to the use of a resource ontology system that includes an interconnected map that links resources that interact with each other, as well as the individual components of the resources. Moreover, the resource ontology system further stores the authentication of the resources, including if the resources are validated for use within application development, as well as whether or not the resources meet or fail to meet other resource requirements. The resource ontology system allows a user developing an application to access resources for use in the application development, which are trusted resources, and moreover, allows the organization to aid in standardizing and optimizing the use of resources that users may use in developing applications for the organization. Furthermore, the resource ontology system allows the user to more easily access and use secondary resources that are linked with resources already used by the user for application development.

The present invention further includes the use of artificial intelligence (AI) and machine learning (ML) (collectively "AI/ML") to provide dynamic detection of potential of resource updates, authentication of the resources updates, and tracking of the links between resources through the use of resource signatures. The resource signatures may provide an indication of the application information, the resources that are accessed by the application, and the resources that access the application. As such, the AI/ML system can monitor and track the applications and updated resources that interact with the application in order to identify any potential security issues, as well as to optimize and standardize the use of resources by the users when developing applications.

One embodiment of the invention comprises a security system for application development. The system comprises one or more memory devices with computer-readable program code stored thereon, and one or more processing devices operatively coupled to the one or more memory devices. The one or more processing devices are configured to execute the computer-readable program code to receive a request to allow access to one or more first resources; access a resource ontology system that comprises an interconnected map of a plurality of resources, wherein the interconnected map links interacting resources; identify from the interconnected map of the plurality of resources when the one or more first resources are verified; grant access to the one or more first resources for use in the development of an application when the one or more first resources are verified; receive a request to allow access to one or more second resources linked with the one or more first resources; and grant access to the one or more second resources based on the links with the one or more first resources in the interconnected map.

In further accord with embodiments, the one or more processing devices are further configured to execute the computer-readable program code to identify one or more second resource requirements for access to the one or more second resources for use in the development of the application.

In yet other embodiments, the one or more second resource requirements comprise compatibility with the one or more first resources, library requirements in which the one or more second resources are located, versions requirements for the one or more second resources, location requirements for the one or more second resources, or entity requirements for the one or more second resources.

In still other embodiments, the one or more processing devices are further configured to execute the computer-readable program code to identify one or more first resource requirements for access to the one or more first resources for use in the development of the application.

In other embodiments, the one or more processing devices are further configured to execute the computer-readable program code to identify when the one or more first resources fail to be verified resources, and verify the one or more first resources.

In further accord with embodiments, the one or more first resources are not verified when the one or more first resources are determined to have a confirmed security element, is unable to be scanned, is unknown resource from a third-party, or is provided by an unknown third-party.

In other embodiments, the interacting resources are resources that are access by other resources or that access other resources, and the interconnected map stores the links between the resources and the other resources.

In still other embodiments, the interconnected map further links the applications to components of the other applications.

In yet other embodiments, the interconnected map further links the individual components of the resources to other individual components of the other resources.

In other embodiments, the request for access to the one or more first resources is requested from a first library.

In further accord with embodiments, granting access to the one or more first resources comprises allowing the system to utilize the one or more first resources requested from the first library.

In other embodiments, granting access to the one or more first resources comprises directing the system to utilize the one or more first resources requested from an alternate library.

In still other embodiments, granting access to the one or more first resources from the alternate library occurs without notifying a requestor making the request.

In yet other embodiments, granting access to the one or more first resources comprises directing the system to utilize one or more alternate resources from an alternate library instead of the one or more first resources.

In other embodiments, granting access to the one or more alternate resources occurs without notifying a requestor making the request.

Another embodiment of the invention comprises a computer-implemented method for application development. The computer-implemented method comprising receiving, by one or more processors, a request to allow access to one or more first resources; accessing, by the one or more processors, a resource ontology system that comprises an interconnected map of a plurality of resources, wherein the interconnected map links interacting resources; identifying, by the one or more processors, from the interconnected map of the plurality of resources when the one or more first resources are verified; granting, by the one or more processors, access to the one or more first resources for use in the development of an application when the one or more first resources are verified; receiving, by the one or more processors, a request to allow access to one or more second resources linked with the one or more first resources; and granting, by the one or more processors, access to the one or more second resources based on the links with the one or more first resources in the interconnected map.

In further accord with embodiments, the method further comprises identifying one or more second resource requirements for access to the one or more second resources for use in the development of the application.

In other embodiments, the one or more second resource requirements comprise compatibility with the one or more first resources, library requirements in which the one or more second resources are located, versions requirements for the one or more second resources, location requirements for the one or more second resources, or entity requirements for the one or more second resources.

In still other embodiments, the method further comprises identifying one or more first resource requirements for access to the one or more first resources for use in the development of the application.

Another embodiment of the invention comprises a computer program product for application development. The computer program product comprising at least one non-transitory computer-readable medium having computer-readable program code portions embodied therein. The computer-readable program code portions comprise an executable portion configured to receive a request to allow access to one or more first resources; an executable portion configured to access a resource ontology system that comprises an interconnected map of a plurality of resources, wherein the interconnected map links interacting resources; an executable portion configured to identify from the interconnected map of the plurality of resources when the one or more first resources are verified; an executable portion configured to grant access to the one or more first resources for use in the development of an application when the one or more first resources are verified; an executable portion configured to receive a request to allow access to one or more second resources linked with the one or more first resources; and an executable portion configured to grant access to the one or more second resources based on the links with the one or more first resources in the interconnected map.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
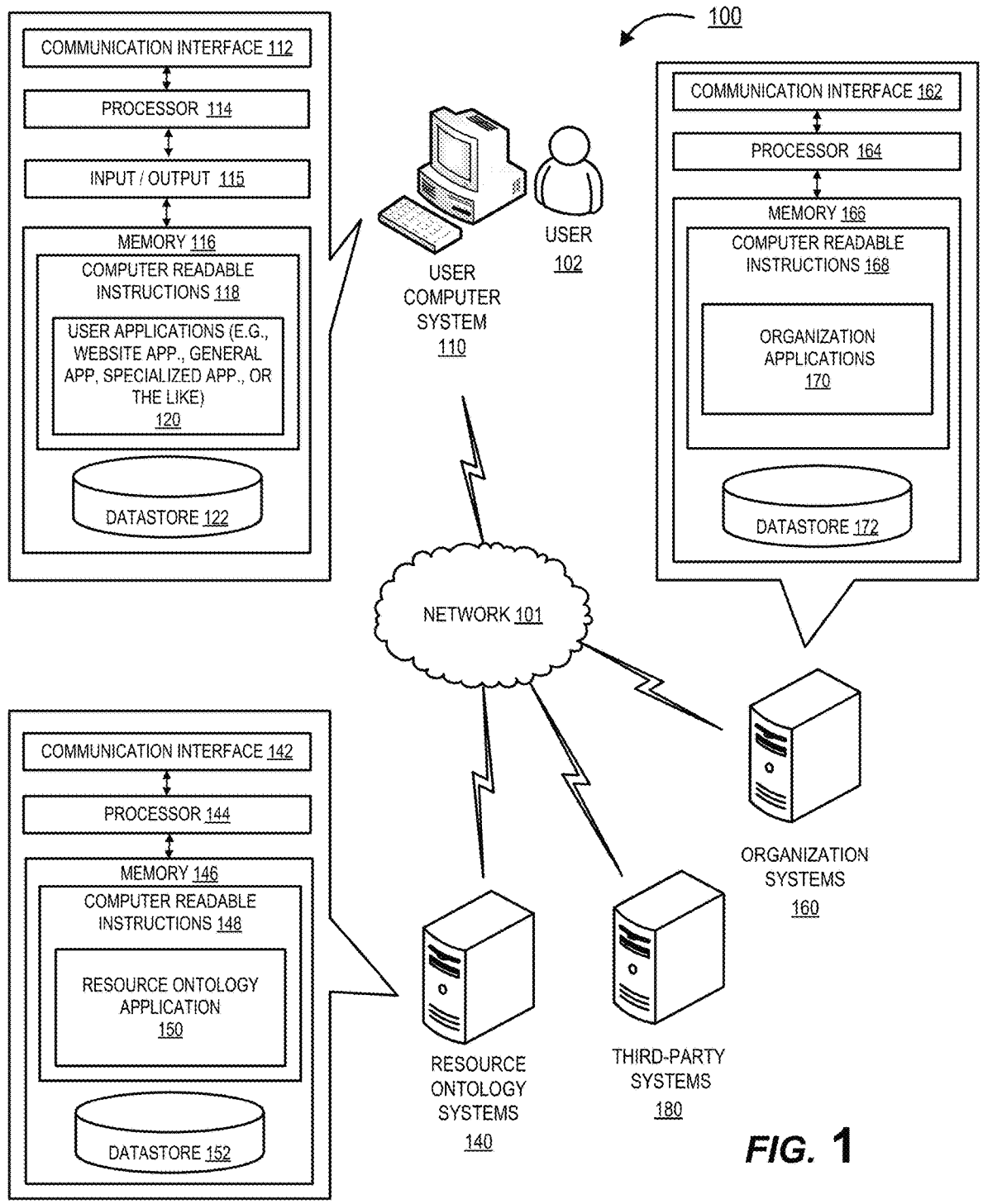

Having thus described embodiments of the invention in general terms, reference will now be made to the accompanying drawings, wherein:

FIG. 1 provides a resource security system environment, in accordance with some embodiments of the present disclosure.

Figure 2:
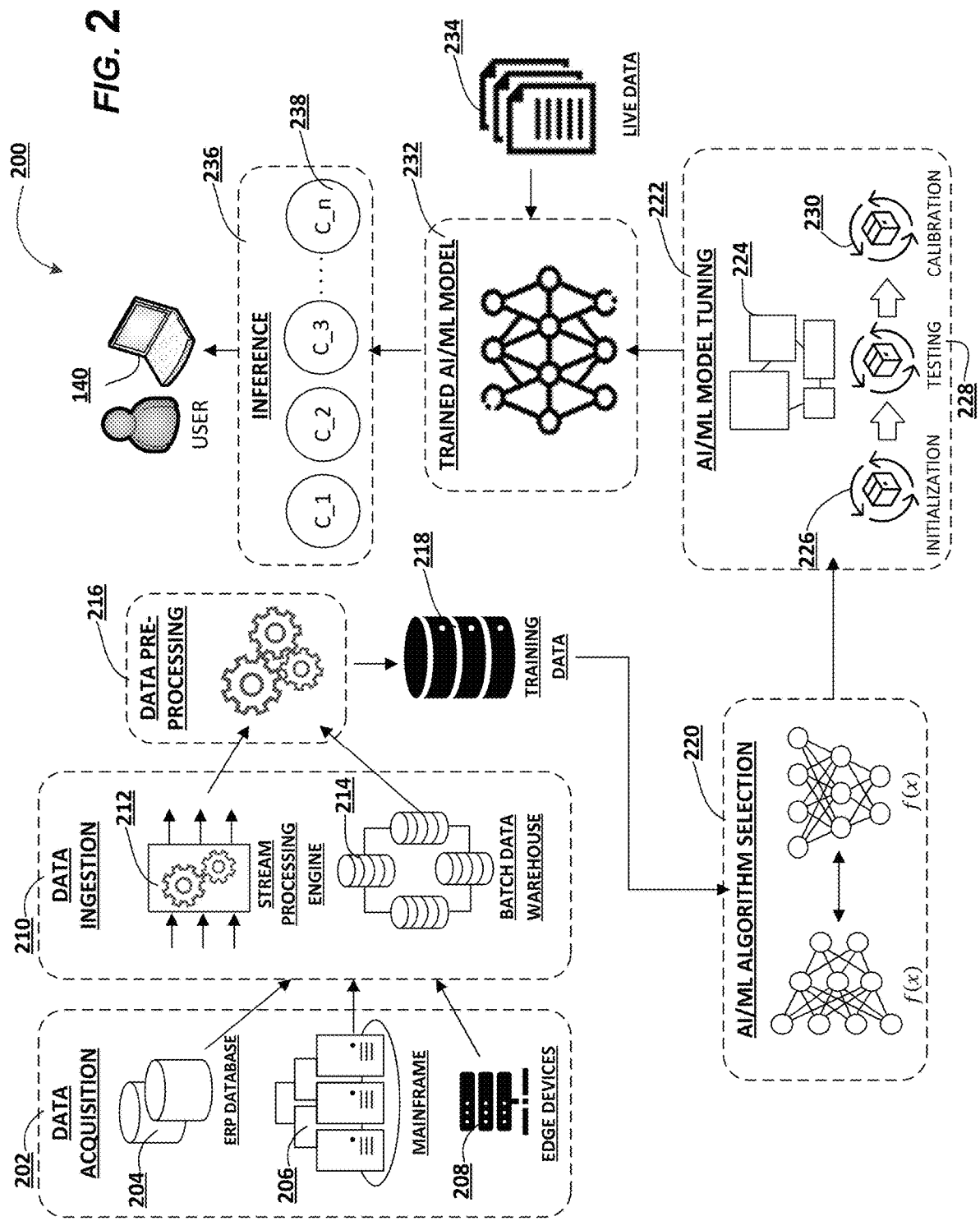

FIG. 2 provides an artificial intelligence (AI) and machine learning (ML) subsystem architecture, in accordance with some embodiments of the present disclosure.

Figure 3:
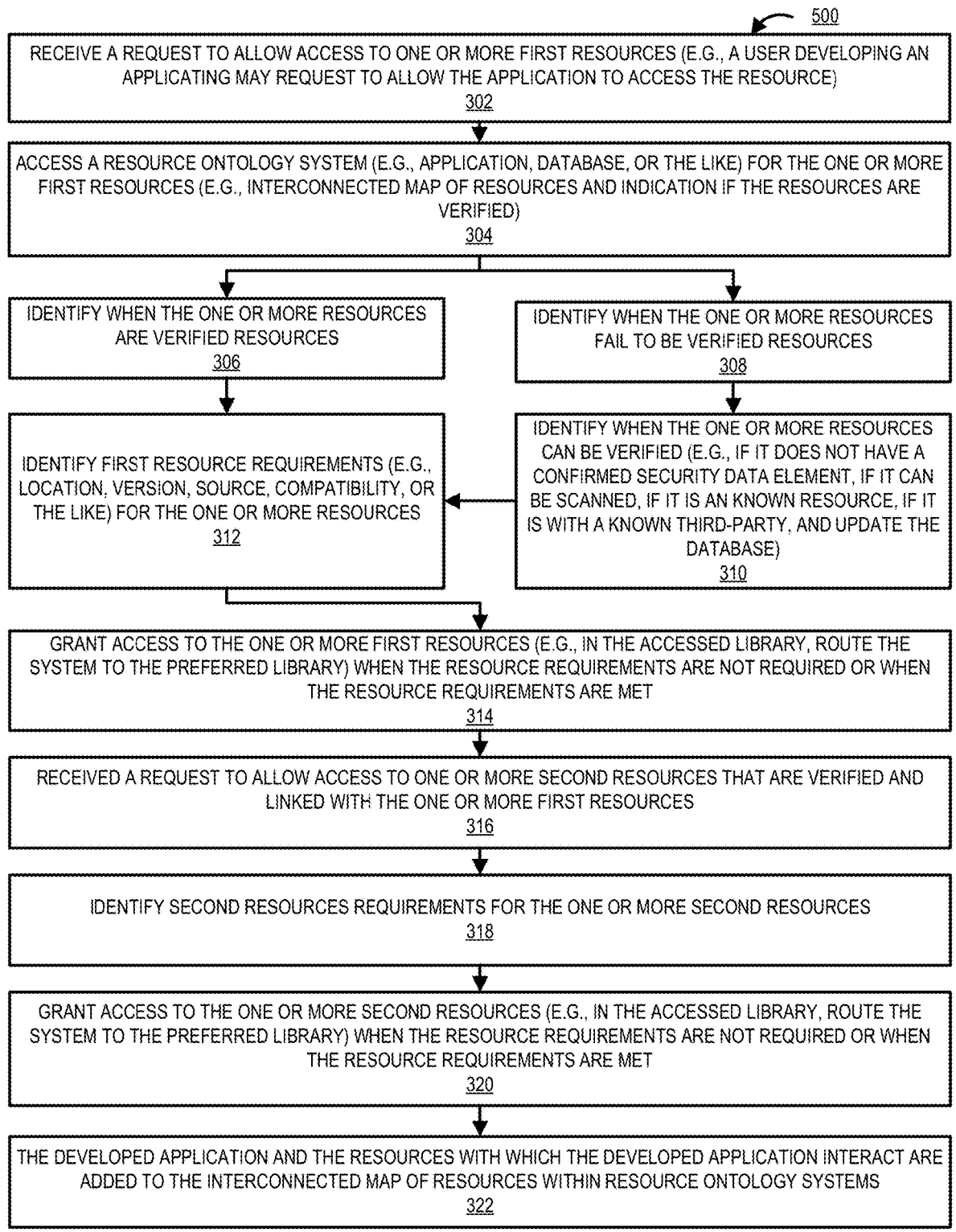

FIG. 3 illustrates a process flow for authentication of the use of interconnected resources within application development, in accordance with some embodiments of the present disclosure.

FIG. 4 illustrates a process flow for authentication of applications using AI/ML, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

FIG. 1 provides a resource security system environment 100 for use in the creating and monitoring applications and the resources with which the applications interact. The resource security system environment includes specialized systems and devices communicably linked across a network to perform the functions of implementing the features for application development that occur over the network 101. As illustrated in FIG. 1, the resource ontology system(s) 140 (e.g., operated by the organization, third-parties, or the like) are operatively coupled, via a network 101 to one or more user computer systems 110, the one or more organization systems 160, and/or the one or more third-party systems 180. In this way, the resource ontology system(s) 140 can send information to, and receive information from, the one or more user computer systems 110, the organization systems 160, and/or the third-party systems 180. FIG. 1 illustrates only one example of some embodiments of the resource security system environment 100, and it will be appreciated that in other embodiments one or more of the systems, devices, or servers may be combined into a single system, device, or server, or be made up of multiple systems, devices, or servers.

In accordance with embodiments of the invention, the term "entity" may be used instead of "user", "party" (e.g., third party), "organization", or the like, or vice versa. As such, it should be understood that while the embodiments described herein discuss communications between users, parties, entities, organizations, and/or each other, it should be understood that the communications may be described as occurring between entities (e.g., a first entity, second entity, or the like). Consequently, the term "entity" may include any user 102 acting on the user's own behalf, any party (e.g., organization, company, third-party or the like) acing on its own behalf, or any user 102 acting on behalf of any party. An "organization" may refer to a business, company, or the like that maintains or operates the system or a portion thereof, including allowing for the creation of applications that utilize resources internally within the organization or externally with third-parties, as will be described herein.

The network 101 may be a system specific network receiving and distributing specific network feeds and identifying specific network associated triggers. The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the entity (e.g., a user 102) utilizes an entity device (e.g., a user computer system 110) to create an application, which may utilize resources that are internal to the organization or external to the organization and located with a third-party. It should be understood that the application may be any type of software (e.g., code for programs for any system, system software, firmware, or the like) that is being developed within and/or for the organization. It should be understood that resources may include an application, database, data, portions thereof, which in some embodiments may be located within a library. As such, the library may include resources, such as a suite of code, data, or the like that are accessed by the user and/or compiler in developing applications. It should be understood that the resources, as used herein may include the library, the components of the library, or specific portions of the components of the library, individually or as a combination thereof.

In some embodiments, the user 102 has a user computer system (e.g., laptop, desktop, mobile device, such as a mobile phone, smart phone, tablet, wearable device, or the like, or other like computer device), which may interact with a user computer system 110 of another user 102 and/or the systems and devices described herein to allow for secure development of applications (e.g., secure access of resources), as will be described in further detail herein. As used herein, the term "user computer system" may refer to any device that employs a processor and memory and can perform computing functions, such as a personal computer or a mobile device, wherein a mobile device is any mobile communication device, such as a cellular telecommunications device (e.g., a cell phone or mobile phone), personal digital assistant (PDA), a mobile Internet accessing device, smartphone, or other mobile device. Other types of user computer systems may include wearable devices (e.g., augmented reality headsets, virtuality reality headsets, or the like that allow for accessing a mixed reality interface), entertainment devices, laptop computers, or any combination of the aforementioned. In some embodiments, a user computer system may refer to any system, platform, server, database, networked device, or the like. The user computer system may be used by the user 102 to access the other system(s) described herein, directly or through an application, online portal, internet browser, virtual private network, or other connection channel. The user computer system may be located within a network of connected computer system that share one or more network storage locations.

As illustrated in FIG. 1, the user computer system 110 may generally include a processing device or processor 114 communicably coupled to devices such as, a memory device 116, user input/output devices 115 (e.g., a user display device, a microphone, keypad, touchpad, touch screen, camera, video recorder, or the like), a communication device or network interface device 112, a power source, a clock or other timer, a positioning system device, such as a geo-positioning system device like a GPS device or the like and the like. The processing device 114 may further include a central processing unit, input/output (I/O) port controllers, a graphics controller or GPU, a serial bus controller and a memory and local bus controller.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processor 114 may include functionality to operate one or more software programs or applications, which may be stored in the memory 116. For example, the processor 114 may be capable of operating applications, such as the user application 120. The user application 120 may be configured to allow the user computer system 110 to transmit and receive data and instructions from the other devices and systems. The user computer system 110 comprises computer-readable instructions 118 and data storage 122 stored in the memory device 116, which in some embodiments include the computer-readable instructions 118 of a user application 120. In some embodiments, the user application 120 allows a user 102 to access and/or interact with the resource ontology systems 140, the organization systems 160, and/or the third-party systems 180 to allow the user to develop applications.

The processor 114 may be configured to use the communication interface 112 to communicate with one or more other devices on a network 101 such as, but not limited to the resource ontology systems 140, the organization systems 160, and/or the third-party systems 180. In this regard, the communication interface 112 may include an antenna operatively coupled to a transmitter and a receiver (together a "transceiver"), modem. The processor 114 may be configured to provide signals to and receive signals from the transmitter and receiver, respectively. The signals may include signaling information in accordance with the air interface standard of the applicable BLE standard, cellular system of the wireless telephone network and the like, that may be part of the network 101. In this regard, the user computer system 110 may be configured to operate with one or more air interface standards, communication protocols, modulation types, and access types. By way of illustration, the user computer system 110 may be configured to operate in accordance with any of a number of first, second, third, fourth, and/or fifth-generation communication protocols and/or the like. For example, the user communication system 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G), fifth-generation (5G), sixth-generation (6G) wireless communication protocols, web3.0 protocols, internet of things, or the like. The user computer system 110 may also be configured to operate in accordance with non-cellular communication mechanisms, such as via a wireless local area network (WLAN) or other communication/data networks. The user computer system 110 may also be configured to operate in accordance Bluetooth® low energy, audio frequency, ultrasound frequency, or other communication/data networks. The user computer system 100 may further be configured to operate in accordance with wired communication, such as through the use of ethernet cables, or the like.

The user computer system 110 may also include a memory buffer, cache memory or temporary memory device operatively coupled to the processor 114. Typically, one or more applications 120 are loaded into the temporary memory during use. As used herein, memory may include any computer readable medium configured to store data, code, or other information. The memory 116 may include volatile memory, such as volatile Random-Access Memory (RAM) including a cache area for the temporary storage of data. The memory 116 may also include non-volatile memory, which can be embedded and/or may be removable. The non-volatile memory may additionally or alternatively include an electrically erasable programmable read-only memory (EEPROM), flash memory or the like.

FIG. 1 further provides a block diagram of the resource ontology systems 140, in accordance with embodiments of the invention. The resource ontology systems 140 generally comprise a communication interface 142, a processor 144, and a memory 146. The processor 144 is operatively coupled to the communication interface 142 and the memory 146. The processor 144 uses the communication interface 142 to communicate with the network 101 and other devices on the network 101, such as, but not limited to the user computer systems 110, the organization systems 160, and/or the third-party systems 180. As such, the communication interface 142 generally comprises a modem, server, transceiver, or other device for communicating with other devices on the network 101.

The resource ontology systems 140 comprise computer-readable instructions 148 stored in the memory 146, which in some embodiments include the computer-readable instructions 150 of one or more resource ontology applications(s) 150 that provide an interconnected map of resources, including in some embodiments, not just resource to resource interactions, but linking of the underlining components of the resources, as will be described in further detail herein. In some embodiments, the resource ontology systems 140 (including the resource ontology application 150) utilizes AI/ML for creating and monitoring the applications and interactions of resources, allowing or denying access to the resources, suggesting alternate resources, analyzing a blueprint of developed applications (e.g., structure of the application, resources accessed by or accessing the application, components of the application, or the like), creating or updating application signatures (e.g., hash values, tokens, other identifiers, or the like) of the applications for tracking, capturing application changes, or the like. In some embodiments, the memory 146 includes data storage 152 for storing data created and/or used by the resource ontology systems 150. In some embodiments, the datastore or data storage 152 of the resource ontology systems 150 may store the mapping of the interconnection of the resources and/or components thereof.

Embodiments of the resource ontology system(s) 140, as will be described herein, may include multiple systems, servers, computers or the like maintained by one or many organizations. FIG. 1 merely illustrates a resource ontology system 140 that, typically, interacts with many other similar systems, such as the user computer systems 110, the organization systems 160, and/or third-party systems 180, to map the interaction of resources. In some embodiments, the resource ontology systems 140, or portions thereof, may be part of an organization system 160, third-party system 180, or vice versa. The resource ontology systems 140 may communicate with the user computer systems 110, organization systems 160, and/or third-party systems 180 via a secure connection generated for secure encrypted communications between the systems.

In some embodiments of the resource ontology systems 140, the memory 146 stores AI/ML application(s) 150. In some embodiments of the present disclosure, AI/ML application(s) 150 may include applications having computer-executable program code that instructs the processor 144 to operate the network communication interface 142 to perform certain functions described herein. In some embodiments, the AI/ML application(s) 150 may also instruct the processor 144 to perform certain logic, data processing, and data storing functions of the application.

The processor 144 is configured to use the communication interface 142 to gather data, such as data corresponding to the interconnections between resources (e.g., internal resources within the organization, external resources managed by third-parties, or the like) from various data sources, such as from the user computer systems 110, organization systems 160, and/or third-party systems 180. The processor 144 stores the data that it receives in the memory 146. The memory 146 may further comprise stored access rights and authentication of the resources, or components thereof. In some embodiments the authentication of the resources may include determining if the resources are validated, determining the resource can be validated (if they have not been previous validated), determining other resource requirements, such as compatibility between resources, or the like, as will be described in further detail herein.

It should be understood that the resource ontology systems 140 may comprise of one or more systems that provide the functions described herein. In particular, the resource ontology systems 140 may comprise an authentication system used to identify users 102 (e.g., customers, misappropriators, or the like) trying to access the organization systems 160 and/or third party systems 180 for accessing resources for application development. Moreover, the resource ontology systems 140 may include an interconnected resource system that stores the mapping of the resources used by applications (e.g., all applications within the organization and the resources used by the applications within and/or outside of the organization). In this way, it should be understood that an application may utilize hundreds, thousands, or tens of thousands of resources, and moreover, an organization may utilize hundreds, thousands, or tens of thousands of applications that the use the resources. Consequently, the interconnected mapping of the resources (in some embodiments including the components thereof) may include hundreds of thousands, millions, tens of millions, hundreds of millions, billions, trillions, or the like of interconnections between of resources. It should be further understood that the resource ontology systems 140 may further include AI/ML resource applications, which may be used to monitor resources, update the mapping, make resource suggestions, create digital signatures to track the applications and associated resources, or the like.

FIG. 1 further provides a block diagram of one or more organization systems 160, in accordance with embodiments of the invention. In some embodiments, the organization systems 160 may refer to the systems of organizations for which the users 102 are developing applications. The organization systems 160 generally comprise a communication interface 162, a processor 164, and a memory 166. The processor 164 is operatively coupled to the communication interface 162 and the memory 166. The processor 164 uses the communication interface 162 to communicate with the network 101 and other devices on the network 101, such as, but not limited to the user computer systems 110, the resource ontology systems 140, and/or the third-party systems 180. As such, the communication interface 162 generally comprises a modem, server, transceiver, or other device for communicating with other devices on the network 101.

The organization systems 160 further comprise computer-readable instructions 168 stored in the memory 166, which in some embodiments include the computer-readable instructions 168 of organization applications 170. In some embodiments, the memory device 166 includes data storage 172 for storing data created and/or used by the organization systems 160, the user computer systems 110, or the resource ontology systems 140.

Embodiments of the organization systems 160 may include multiple systems, servers, computers or the like maintained by one or many organizations. In some embodiments, the resource ontology systems 140 may or may not be distinct from the organization systems 160. The organization systems 160 may communicate with the resource ontology systems 140 via secure connections generated for secure encrypted communications between the systems.

In some embodiments of the organization systems 160, the memory 166 stores organization applications 170. In some embodiments, the memory 166 stores data including, but not limited to, the internal resources within the organization that are used for the creation of the applications discussed herein. In some embodiment of the disclosure, the organization applications 170 may associate with applications having computer-executable program code that instructs the processor 164 to operate the network interface 162 to perform certain communication functions described herein. In some embodiments, the computer-executable program code of the organization applications 170 may also instruct the processor 164 to perform certain logic, data processing, and data storing functions of the application.

The one or more third party systems 180 may comprise the systems that include external resources that may be accessed and used when creating and/or operating applications developed by the one or more users. The third-party systems 180 may have components that are the same as or similar to the user computer systems 110, the resource ontology systems 140, and/or the organization systems 160 (e.g., communication interfaces, processors, memories, datastore, or the like as described above). As such, when a user 102 is developing an application, the third-party systems 180 may be accessed to incorporate resources into the application being developed (e.g., use code, allow an application to call, access data, or the like).

FIG. 2 illustrates an exemplary AI/ML subsystem architecture 200, which may be a part of the resource ontology systems 140 and/or work with the resource ontology systems 140, in accordance with embodiments of the present invention. The AI/ML subsystem architecture 200 may be utilized to create and/or maintain the interconnected resource mapping, allow or deny access to resources for use in developing applications, create and update application signatures for tracking and storing changes to the applications, make resource suggestions, substitute resources for selected resources, or the like, as will be described in further detail with respect to FIGS. 3 and 4. The AI/ML subsystem 200 may include a data acquisition engine 202, data ingestion engine 210, data pre-processing engine 216, ML model tuning engine 222, and/or inference engine 236.

The data acquisition engine 202 may identify various internal and/or external data sources to generate, test, and/or integrate new features for training the machine learning model 224. These internal and/or external data sources 204, 206, and 208 may the locations where the data originates or where physical information is first digitized. In some embodiments, the internal data sources are the resources that are internal to the organization, while the external data sources may include the resources that are supported by third parties. The data acquisition engine 202 may identify the location of the resources, determine whether or not the resources are authenticated (e.g., validated, compatible, or the like), identify the applications that use the resources, determine when the resources change (e.g., are updated, capture data from different locations, or the like), aid in mapping the resources, or the like. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 204, 206, and 208 may include a plurality of libraries that store resources used in developing applications, databases that store the interactions between resources, and/or the components of each of the resources. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it may need to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), such as, computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AL/ML model tuning engine 222 may be used to train a machine learning model 224 using the training data 218 to make predictions or decisions without explicitly being programmed to do so. The AL/ML model 224 represents what was learned by the selected AL/ML algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomizer 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the AI/ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the AL/ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained AI/ML model 232, similar to any other software application output, can be persisted to storage, file, memory, or application, or looped back into the processing component to be reprocessed. More often, the trained AI/ML model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 ... C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 ... C_n 238) live data 234 based on how similar they are to one another to solve exploratory challenges where little is known about the data, provide a description or label (e.g., C_1, C_2 ... C_n 238) to live data 234, such as in classification, and/or the like. These categorized outputs, groups (clusters), or labels are then presented to the user input system 130.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for the operation of the resource security system environment 100, and in particular, for authentication of the resources for use with an application being developed by a user. As illustrated in block 302, the system (e.g., organization system 160, or the like) receives a request to allow access to one or more first resources. For example, a user 102 developing an application may request for access to one or more first resources for use with a development application. In some embodiments the request may be to allow the user to access a resource library having a plurality of resources, to access a specific resource, to access a component of a resource, or the like. In some embodiments the request for the resource may be to access another application to incorporate within the development application, a request to allow the development application to call on another resource when compiling or running, a request to utilize code, to access data from a database, and/or any other operation that may be required when a user 102 is developing an application.

In some embodiments, the organization system 160 may require that the user provides authentication credentials (e.g., user name, password, two-factor authentication, permissions, or the like) before allowing the user to access the one or more resources for use with the development application.

Block 304 illustrates in FIG. 3 that the system (e.g., organization system 160, or the like) may access a resource ontology system 140 (e.g., application, database, or the like) in order to determine if the one or more first resources are authenticated for use. It should be further understood that the resource ontology system 140 may utilize a resource ontology application 150, database 152, or the like to store an interconnected map of resources. That is, the interconnected map, as previously discussed herein, may include the plurality of resources (e.g., internal resources within the organization or external resources that are with third-parties) that are authenticated for use and/or denied for use in the development of an application. The interconnected map may further comprise resource information for each of the resources. The resource information may include users (e.g., individual users, groups of users, business lines, or the like), systems, applications, or the like that have permission to utilize the resources. Moreover, the resource information may include descriptions of the resource (e.g., resource purpose, version, third-party provider, location—country of origin, server on which the resource is located, system requirements for use of the resources, or the like). Additionally, the resource information may include resource links (e.g., hashes, tokens, tags, resource identifiers, or the like) that indicate a hieratical structure that notes all of the parent resources (e.g., accessing resources, or the like) that interact with a selected resource, as well as all of the child resources (e.g., accessed resources, or the like) that interact with the selected resource. It should be understood that in some embodiments each of the resources that are linked with other resources, not only include application-to-application links, but also links between the individual components (e.g., databases, compliers, libraries, scripts, open source software, or the like that the application uses) of a specific resource (e.g., application, or the like). As such, the resource ontology system 140 provides an interconnected web of resources, and/or components thereof, used within the business.

As part of the authentication process for determining if the request to access one or more first resources is allowed, as illustrated in block 306, the system (e.g., organization system 160, resource ontology system 140, or the like) identifies when the one or more first resources are verified resources and/or as illustrated in block 308 when the one or more first resources fail to be verified. The determination of the whether or not the resources are verified may be a pre-verification of the resources based on historical and/or current resource information. For example, as will be described in further detail with respect to block 310, a resource may be verified when it meets or fails to meet one or more verification requirements. In some embodiments, the verification requirements may be a set of questions that the resource must meet, or fail to meet, in order to be verified.

When the resource has not been pre-verified, such as when the resource is not listed in the resource ontology system 140, or is listed as unverified within the resource ontology system 140, the system (e.g., resource ontology system 140, organization system 160, user computer system 110) may determine when the one or more resources can be verified, as illustrated in block 310. In some embodiments the verification requirements may be a determination that the resource is known or not known to have a security incident (e.g., been known to be accessed by an unauthorized user, have compromised code, been involved in a misappropriation action, or the like). The verification requirements may further include a determination that the resource can or cannot be scanned for harmful code (e.g., viruses, trojan horses, worms, or the like). Moreover, the verification requirements may include a determination that the resource is a known accepted resource (e.g., a trusted resource) that is provided by one or more known or unknown third parties. The verification may further include a determination that the resource is a unknown resource that is provided by a known accepted third-party (e.g., a trusted third-party entity). It should be understood that the verification requirements may include additional requirements, or exclude one or more of the verification requirements discussed above.

When the one or more resources are not pre-verified, and cannot be verified by the system (e.g., resource ontology system 140, the organization system 160, or the like), the system (e.g., resource ontology system 140, the organization system 160, or the like) may prevent the use of the resources, send a warning not to use the resources, direct the user 102 to other resources, or the like.

Block 312 of FIG. 3 further illustrates that when the one or more first resources are verified (e.g., either identified as pre-verified, verified when requested, or the like), a determination is made if there are any additional requirements for verification. For example, the additional resource requirements may include a determination of system or application requirements that are needed to allow the development application and resource to interact, such as but not limited, version requirements, memory requirements, processing speed requirements, operating system requirements, code requirements, file size requirements, or the like. Moreover, it should be understood that the additional resource requirements may include a preferred resource for use with the application development instead of the specific resource requested. In some embodiments, while the requested resource may be authenticated, the requested resource may be located in a specific library, from a specific entity (e.g., internal organization, third-party, or the like), be a specific type of resource, or the like. While the requested resource may be used, the organization may have a preferred resource that is the same as, or similar to, the requested resource. The preferred resource may be located within a preferred library, may be provided by a preferred party, may be a specific resource type, or the like. For example, the preferred library may be located within the organization systems 160 instead of with a third-party systems 180. Moreover, the license costs for accessing the requested library may be more than accessing the preferred library (e.g., a discount is applied for internal resources, resources with a specific third-party, or the like). In other embodiments, the organization may want to utilize a preferred resource in order to standardize application development and/or provide more control over the resource used (e.g., requires reduced number of resources that have to be monitored and tracked). Consequently, in some embodiments of the invention an AI/ML application may direct the requestor (e.g., user, system, application, or the like) to a preferred resource for use with the development application. The AI/ML application may make a resource suggestion to use the preferred resource, which the user may or may not accept. Alternatively, the AI/ML application may notify the user and require the user to utilize the preferred resource. In other embodiments, the AI/ML application may just automatically use the preferred resource as a substitute for the requested resource without informing the user of the change in resources.

FIG. 3 illustrates in block 314 that when the one or more resources are authenticated (e.g., verified and/or resource requirements are met), access is granted to the one or more resources for use with the development application. That is, the system and/or user crating the development application may utilize the resource in the development of the development application.

As illustrated in block 316, an additional request may be made to allow access to one or more second resources that are linked with the one or more first resources in the interconnected map of the plurality of resources. For example, the system may receive the request to access the one or more second resource for use with the development application. As such, the system may access the resource ontology systems 140 to determine if the one or more second resources are linked with the one or more first resources that have already been authenticated (e.g., verified and/or resource requirements are met). In typically configurations, since the one or more second resources are already linked with the authenticated one or more first resources within the interconnected map of resources, the system does not have authenticate the one or more second resources. That is, the one or more second resources have already been authenticated for use with the one or more first resources, and as such, may be automatically authenticated for use in the development application. However, as illustrated in block 318, in some embodiments one or more second resource requirements may be attached to the one or more second resources. As such, while the one or more second resources that are linked with the one or more first resources may not have to be verified for the authentication step (e.g., they have already been verified), the one or more second resources may be analyzed to determine if one or more second resource requirements are met. The one or more second resource requirements may be the same as, or similar to, the resource requirement described with respect to block 312 above. That is, while the one or more second resources have been verified for use, the AI/LM application may provide preferred one or more second resources (e.g., internal library, standardized resource, or the like) or require other resource requirements.

As illustrated in block 320, and as previously described with respect to block 314, if the one or more second resource requirements are met, access is grated for the use of the one or more second resources for the creation of the development application. Moreover, as previously discussed, the access granted may be for the specific second resources requested or for preferred resources.

As illustrated by block 322, the development application, after or as it is being created, may be stored in the resource ontology system 140 (e.g., databases 152, or the like) and the resources with which the development application interacts may also be mapped and stored by the resource ontology systems 140.

The embodiments of the invention described herein provides trusted authentication of resources used for developing application, and moreover, improves standardization of the resources used by an organization within application development. Consequently, application development may be more efficient, and moreover, standardizing the resources being used in application development reduces the processing capacity requirements, the memory storage requirements, and increases processing speeds since the resource being used during application development can be optimized. That is, the organization system (e.g., AI/ML application) directs the user to utilize preferred resources that may optimize the organization systems. For example, the organization directs the developed applications to resources that may increase application processing, data retrieval, memory storage, or the like.

FIG. 4 illustrates a process for authenticating applications using AI/ML systems. As discussed herein a user 102 may be utilizing the user computer systems 110 to develop applications. As further described herein, the resources that interact with the development application may be mapped and stored within the resource ontology system 140. In order to be able to monitor and track the applications being developed, as well as the resources with which the application interacts, a resource signature may be used with each of the resources. In some embodiments the resource signature may be used all of the resources; however, in some embodiments the resource signature may be an application signature that is specific to applications that are developed for the organization. It should be understood that an organization may have hundreds, thousands, tens of thousands, hundreds of thousands of applications that are developed for the organization. Moreover, each application is not just a set of its own unique code, but instead portions of unique code that is used to access hundreds, thousands, tens of thousands of other resources (e.g., libraries, applications within the libraries, code, data, compliers, or the like). Every time an application is updated (e.g., a new resource is accessed, a new resource access the application, or the like) and/or a resource with which the application interacts is updated (e.g., new data is added to the resource, the resource version is changed, code is amended, resource ownership changes, or the like), such updates creates situations in which potential security issues could occur (e.g., potential misappropriation of data, unauthorized access of systems, or the like). Moreover, the resources with which an application may interact may change every second, minute, minutes, hours, or the like. As such, AI/ML systems may be required in order to monitor and track the changes in the resources and the potential effects on the applications.

As such, as illustrated in block 402 of FIG. 4, when a development application is created that interacts with resources, a resource signature, such as an application signature may be created that defines the application and/or the resources with which the application interacts. In some embodiments the AI/ML system may be able to scan the developed application (e.g., the components, the resources access, the configurations, the code, or the like), effectively analyze the blueprints for the developed application, and create an application signature. For example, the application signature may provide an indicator of the application (e.g., the version of the application, the components of the application, the purpose of the application, the server on which the application is located, the security requirements for the application, the line of business for the application, the responsible administrators for the application, or the like), the resources that are accessed by the application (e.g., versions, locations, source, verification, resource requirements, or the like), the resources that access the application (e.g., versions, locations, source, verification, resource requirements, or the like), or the like. The application signature may be a token, a hash value, an identifier, or the like. Regardless of the form the application signature may be a character string (e.g., numbers, letters, symbols, or the like) that provide a representation of the application. Algorithms may be used to create the application signature and/or to break down the application signature to determine the application information, the resources accessed by the application, and/or the resources that access the application. As such, the AI/ML system may be utilized to more easily monitor, identify, and/or track the application and the resources with which the application interacts.

Block 404 of FIG. 4, further illustrates that the signature is coupled to the application. For example, the signature may be embedded into the code of the application, into the about information for the application, and/or in some embodiments may be linked with the application within the resource ontology systems 140. That is, the signature may be linked within the interconnected map of resources in the resource ontology database 152.

FIG. 4 further illustrates in block 406 that the AI/ML system is used to monitor when a resource is updated. For example, a resource may be updated when new data is added to the resource, when the code of the resource changes, when the resource is updated to a new version, when the location of resource changes (e.g., moved to a different library, server, or the like), when ownership of the resource changes, when resources to which the resource is linked are updated, when resource configurations change, when authentication changes (e.g., verification is changed, resource requirements change, or the like), when the resource experiences a security incident (e.g., unauthorized access, data is misappropriated, or the like), or other like changes in the resources. As such, the AI/ML system monitors applications and/or resources both within the organization and with third-parties to identify when the resources have been updated. For example, the AI/ML system may access databases to identify when the database notes that the resource has changed. Additionally, or alternatively, the AI/ML system may access the specific resources and compare the current resource with stored information about the resource to determine when the resource has change (e.g., upgraded to a new version, or the like). Alternatively, or additionally, when a resource has been updated (e.g., changes, or the like) the entity (e.g., organization or a third-party) that updated the resource may send a notification (e.g., automatically, or the like) to the AI/ML system and/or to the resource ontology system 140 to indicate that the resource has been updated.

When a resource has been identified as being updated, the AI/ML system utilizes the resource ontology system 140, in particular, the interconnected map of resources, to identify the updated resource and identify the other resources that interact with the updated resource (e.g., other resources accessed by the updated resource, other resources that access the updated resource, or the like), as illustrated by block 408 of FIG. 4. In some embodiments, the identification of the resources may be based on the linked relationships within the resource ontology database 152. In other embodiments, the identification of the resources may be based on the signature coupled to the resources. For example, the signature may be utilized by the AI/ML system to identify the resources (e.g., other applications, or the like) that interact with the updated resource.

As illustrated by block 410, the updated resources, and the resources that interact with any of the updated resources (e.g., that incorporate the updated resource, or are accessed by the updated resources), may be authenticated, as previously described herein. For example, the AI/ML system may determine that the updated resource is still valid (e.g., meets the questions previously described herein), and/or that any other resource requirements are met. Moreover, the AI/ML systems may also determine that the resources that interact with the updated resource (e.g., that access the resource, that are accessed by the resources, or the like) are also still authenticated (e.g., are still valid, still meet the resource requirements, or the like).

As illustrated in block 412 of FIG. 4, the AI/ML system may analyze the updated resource and/or other resources that interact with the updated resource and update the signatures for the resources. The updated signatures may comprise creating a new signature (and storing the updated signature), creating an amended signature, adding on one or more characters to the most recent signature, adding a tag to the most recent signature, or the like. The updated signature reflects the change in the updated resource and other resources with which the updated resource interacts (e.g., application that interacts with the updated resource, or the like).

FIG. 4 further illustrates in block 414 that the interconnected map of resources is updated with the updated signatures, authentication, linking, and/or other information for the updated resources. As such, the resource ontology system 140 is updated to allow the AI/ML system to be able to continue to track and monitor changes in the resources.

The embodiments of the invention described herein provides trusted authentication of developed applications from origination through the life cycle of the application as resources change over time. The invention allows for the proper manufacture and generation of the developed applications using resources from reputable sources, while minimizing errors since the resources used are being analyzed and authenticated over time as the resources are updated. Moreover, due to the shear number of applications and resources, and the interaction of the resources with each other, the analysis of the updated resources and the associated links with other resources would be impossible to monitor and track without the use of AI/ML. As such, the present invention improves application development and standardization of the resources used by an organization within application development. Consequently, application development may be more efficient, and moreover, standardizing the resources being used in application development reduces the processing capacity requirements, the memory storage requirements, and increases processing speeds since the resource being used during application development can be optimized. Moreover, the AI/ML systems are used to more effectively reduce potential security issues since the AI/ML systems are quickly able to identify updated resources that are no longer authenticated (e.g., no longer verified, no longer meet authentication requirements, or the like), which allows applications to be updated with alternative resources quickly when potential security issues arise with updated resources. Finally, the improved monitoring and tracking of updated resources increases standardization of resource usage, which improves application processing speeds, improves memory storage, and increases system efficiency.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with real-time payment clearing and settlement.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for real-time payment clearing and settlement, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 17/887,123 | SYSTEMS AND METHODS FOR IDENTIFYING AND VERIFYING SOFTWARE COMPONENT STORAGE LOCATIONS IN A NETWORK ENVIRONMENT | Aug. 12, 2022 |
| 17/887,152 | ELECTRONIC SYSTEM FOR IMPLEMENTING INTERCONNECTIONS AND AUTHENTICATING PERMISSIONS BETWEEN RESOURCE COMPONENTS | Aug. 12, 2022 |
| 17/887,089 | ELECTRONIC ARTIFICIAL INTELLIGENCE SYSTEM FOR AUTHENTICATING SOFTWARE | Aug. 12, 2022 |
| 17/886,822 | ELECTRONIC SECURITY SYSTEM OF NETWORK RESOURCE COMPONENT TRACKING AND ANALYSIS ACROSS A DISTRIBUTED NETWORK AND CONSTRUCTION OF A VALIDATED NETWORK RESOURCE COMPONENT LIBRARY | Aug. 12, 2022 |
| 17/886,832 | ELECTRONIC SYSTEM FOR DYNAMIC ADAPTED SECURITY ANALYSIS OF NETWORK RESOURCE COMPONENTS | Aug. 12, 2022 |
| 17/886,846 | DYNAMIC QUARANTINE ENGINE INTEGRATION WITH A VALIDATED NETWORK RESOURCE COMPONENT LIBRARY FOR NETWORK SECURITY | Aug. 12, 2022 |
| 17/886,862 | ELECTRONIC SYSTEM FOR SECURITY ANALYSIS AND VALIDATION DURING CONSTRUCTION AND DEPLOYMENT OF DYNAMIC NETWORK COMPONENTS | Aug. 12, 2022 |

What is claimed is:

1. A security system for application development, the security system comprising:
one or more memory devices with computer-readable program code stored thereon; and
one or more processing devices operatively coupled to the one or more memory devices, wherein the one or more processing devices are configured to execute the computer-readable program code to:
receive a request to allow access to one or more first resources, wherein the request to allow access to the one or more first resources is requested from a first library;
access a resource ontology system that comprises an interconnected map of a plurality of resources, wherein the interconnected map of the plurality of resources links interacting resources, and wherein the interconnected map of the plurality of resources is created and maintained by a trained artificial intelligence and machine learning (AI/ML) subsystem;
identify when the one or more first resources fail to be verified resources, wherein access is prevented to the one or more first resources that fail to be verified, and wherein the one or more first resources are not verified when the one or more first resources:
are unable to be scanned;
are an unknown resource from a third-party; or
are provided by an unknown third-party;
verify the one or more first resources;
identify from the interconnected map of the plurality of resources when the one or more first resources are verified;
grant access to the one or more first resources for use in development of an application when the one or more first resources are verified, wherein granting access to the one or more first resources comprises directing the resource ontology system to utilize one or more alternate resources from an alternate library instead of the one or more first resources without notifying a requestor making the request to allow access to the one or more first resources;
receive a request to allow access to one or more second resources linked with the one or more first resources in the interconnected map of the plurality of resources, wherein allowing access to the one or more second resources comprises substituting the one or more second resources with one or more preferred second resources as determined by the trained AI/ML subsystem without notifying the requestor making the request to allow access to the one or more second resources; and
grant access to the one or more second resources based on the links with the one or more first resources in the interconnected map of the plurality of resources.

2. The security system of claim 1, wherein the one or more processing devices are further configured to execute the computer-readable program code to:
identify one or more second resource requirements for access to the one or more second resources for use in the development of the application.

3. The security system of claim 2, wherein the one or more second resource requirements comprise compatibility with the one or more first resources, library requirements in which the one or more second resources are located, versions requirements for the one or more second resources, location requirements for the one or more second resources, and entity requirements for the one or more second resources.

4. The security system of claim 1, wherein the one or more processing devices are further configured to execute the computer-readable program code to:
identify one or more first resource requirements for access to the one or more first resources for use in the development of the application.

5. The security system of claim 1, wherein the interacting resources are resources that are accessed by other resources or that access other resources, and wherein the interconnected map of the plurality of resources stores the links between the resources and the other resources.

6. The security system of claim 5, wherein the interconnected map of the plurality of resources further links other applications to components of the other applications.

7. The security system of claim 5, wherein the interconnected map of the plurality of resources further links individual components of the resources to other individual components of the other resources.

8. The security system of claim 1, wherein granting access to the one or more first resources comprises allowing the resource ontology system to utilize the one or more first resources requested from the first library.

9. The security system of claim 1, wherein granting access to the one or more first resources comprises directing the resource ontology system to utilize the one or more first resources requested from the alternate library.

10. The security system of claim 9, wherein granting access to the one or more first resources from the alternate library occurs without notifying a requestor making the request to allow access to the one or more first resources from the alternate library.

11. A computer-implemented method for application development, the computer-implemented method comprising:
receiving, by one or more processors, a request to allow access to one or more first resources, wherein the request to allow access to the one or more first resources is requested from a first library;
accessing, by the one or more processors, a resource ontology system that comprises an interconnected map of a plurality of resources, wherein the interconnected map of the plurality of resources links interacting resources, and wherein the interconnected map of the plurality of resources is created and maintained by a trained artificial intelligence and machine learning (AI/ML) subsystem;
identifying, by the one or more processors, when the one or more first resources fail to be verified resources, wherein access is prevented to the one or more first resources that fail to be verified, and wherein the one or more first resources are not verified when the one or more first resources:
are unable to be scanned;
are an unknown resource from a third-party; or
are provided by an unknown third-party;
verifying, by the one or more processors, the one or more first resources;
identifying, by the one or more processors, from the interconnected map of the plurality of resources when the one or more first resources are verified;
granting, by the one or more processors, access to the one or more first resources for use in development of an application when the one or more first resources are verified, wherein granting access to the one or more first resources comprises directing the resource ontology system to utilize one or more alternate resources from an alternate library instead of the one or more first resources without notifying a requestor making the request to allow access to the one or more first resources;
receiving, by the one or more processors, a request to allow access to one or more second resources linked with the one or more first resources in the interconnected map of the plurality of resources, wherein allowing access to the one or more second resources comprises substituting the one or more second resources with one or more preferred second resources as determined by the trained AI/ML subsystem without notifying the requestor making the request to allow access to the one or more second resources; and granting, by the one or more processors, access to the one or more second resources based on the links with the one or more first resources in the interconnected map of the plurality of resources.

12. The computer-implemented method of claim 11, further comprising:
identifying, by the one or more processors, one or more second resource requirements for access to the one or more second resources for use in the development of the application.

13. The computer-implemented method of claim 12, wherein the one or more second resource requirements comprise compatibility with the one or more first resources, library requirements in which the one or more second resources are located, versions requirements for the one or more second resources, location requirements for the one or more second resources, or entity requirements for the one or more second resources.

14. The computer-implemented method of claim 11, further comprising:
identifying, by the one or more processors, one or more first resource requirements for access to the one or more first resources for use in the development of the application.

15. A computer program product for application development, the computer program product comprising at least one non-transitory computer-readable hardware storage medium having computer-readable program code portions embodied therein, the computer-readable program code portions comprising:
an executable portion configured to receive a request to allow access to one or more first resources, wherein the request to allow access to the one or more first resources is requested from a first library;
an executable portion configured to access a resource ontology system that comprises an interconnected map of a plurality of resources, wherein the interconnected map of the plurality of resources links interacting resources, and wherein the interconnected map of the plurality of resources is created and maintained by a trained artificial intelligence and machine learning (AI/ML) subsystem;
an executable portion configured to identify when the one or more first resources fail to be verified resources, wherein access is prevented to the one or more first resources that fail to be verified, and wherein the one or more first resources are not verified when the one or more first resources:
are unable to be scanned;
are an unknown resource from a third-party; or
are provided by an unknown third-party;
an executable portion configured to verify the one or more first resources;
an executable portion configured to identify from the interconnected map of the plurality of resources when the one or more first resources are verified;
an executable portion configured to grant access to the one or more first resources for use in development of an application when the one or more first resources are verified, wherein granting access to the one or more first resources comprises directing the resource ontology system to utilize one or more alternate resources from an alternate library instead of the one or more first resources without notifying a requestor making the request to allow access to the one or more first resources;

an executable portion configured to receive a request to allow access to one or more second resources linked with the one or more first resources in the interconnected map of the plurality of resources, wherein allowing access to the one or more second resources comprises substituting the one or more second resources with one or more preferred second resources as determined by the trained AI/ML subsystem without notifying the requestor making the request to allow access to the one or more second resources; and an executable portion configured to grant access to the one or more second resources based on the links with the one or more first resources in the interconnected map of the plurality of resources.

\* \* \* \* \*